United States Patent
Cockrell

(10) Patent No.: US 7,588,129 B2
(45) Date of Patent: Sep. 15, 2009

(54) HYDRAULIC CYLINDER LIMITER

(75) Inventor: David G. Cockrell, Pekin, IL (US)

(73) Assignee: CNH America LLC, New Holland, PA (US)

( * ) Notice: Subject to any disclaimer, the term of this patent is extended or adjusted under 35 U.S.C. 154(b) by 11 days.

(21) Appl. No.: 12/058,167

(22) Filed: Mar. 28, 2008

(65) Prior Publication Data

US 2008/0236969 A1    Oct. 2, 2008

Related U.S. Application Data

(60) Provisional application No. 60/920,521, filed on Mar. 28, 2007.

(51) Int. Cl.
*B62D 17/00* (2006.01)
*B60G 9/02* (2006.01)

(52) U.S. Cl. ............ 188/321.11; 267/66; 280/86.75; 280/124.1

(58) Field of Classification Search ............ 188/321.11, 188/322.12, 300, 302–306; 267/27, 32, 64.11, 267/64.12, 66–68, 220–228, 259; 280/86.75–86.757, 280/124.1–124.174; 248/298.1, 229.1, 923
See application file for complete search history.

(56) References Cited

U.S. PATENT DOCUMENTS

| | | | | | |
|---|---|---|---|---|---|
| 3,801,086 | A | * | 4/1974 | Raidel | 267/67 |
| 4,125,276 | A | * | 11/1978 | Levasseur | 280/124.108 |
| 4,133,554 | A | * | 1/1979 | Lampert | 280/124.107 |
| 4,267,896 | A | * | 5/1981 | Hendriksen | 280/86.75 |
| 4,736,964 | A | * | 4/1988 | Specktor | 280/86.75 |
| 5,052,711 | A | * | 10/1991 | Pirkey et al. | 280/86.753 |
| 5,775,719 | A | * | 7/1998 | Holden | 280/86.75 |
| 7,156,404 | B2 | * | 1/2007 | Krieger | 280/86.75 |
| 2005/0023790 | A1 | * | 2/2005 | Galazin | 280/124.116 |
| 2005/0029770 | A1 | * | 2/2005 | Kim | 280/124.128 |
| 2007/0145706 | A1 | * | 6/2007 | Penzotti | 280/124.174 |

* cited by examiner

*Primary Examiner*—Christopher P Schwartz
(74) *Attorney, Agent, or Firm*—Patrick Sheldrake; John William Stader; Michael G. Harms

(57) ABSTRACT

A limiter bracket, for restricting the stroke of a hydraulic cylinder, is formed from a U-shaped member having a central base portion and two opposing sidewall. The base has a semi-circular retention slot extending from an off center position centrally located detent within the base. The opening of the slot is asymmetrically located at an off center position along an edge of the base so that the rod of a cylinder is both horizontally and vertically displaced during positioning within the limiter. Once the rod is located in the detent of the limiter, a pivot pin is inserted through a connector at the end of the rod and the aligned attachment holes in the sidewalls securing the limiter to the rod. The end of the cylinder body will contact the base of the limiter during retraction of the rod thus limiting the overall stroke of the cylinder.

9 Claims, 3 Drawing Sheets

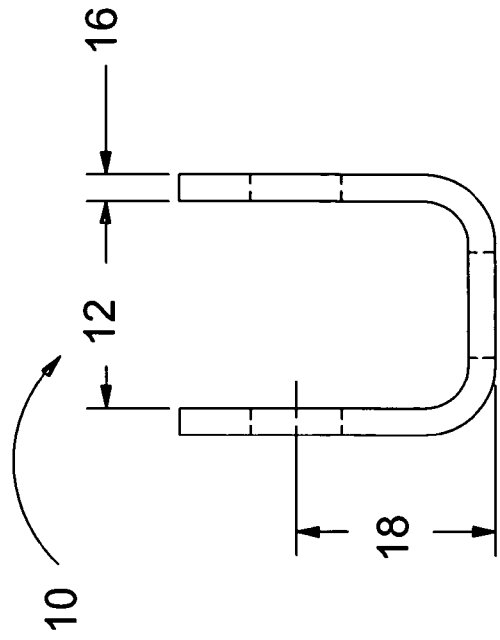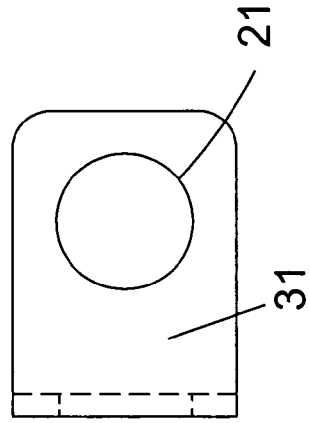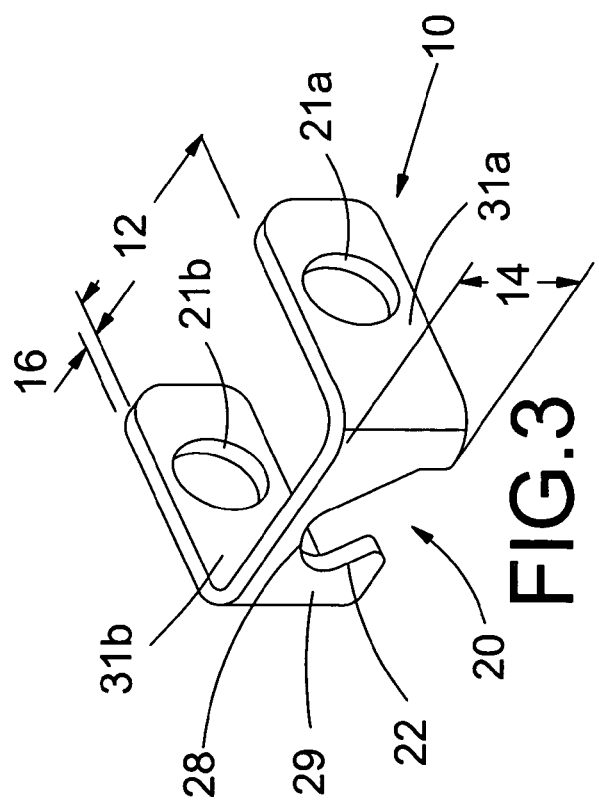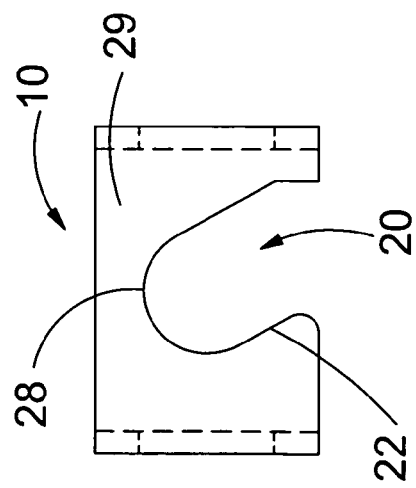

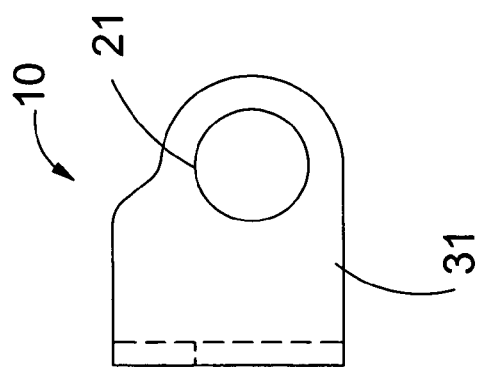
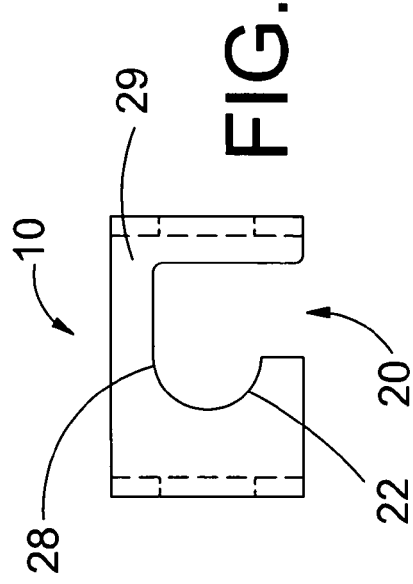
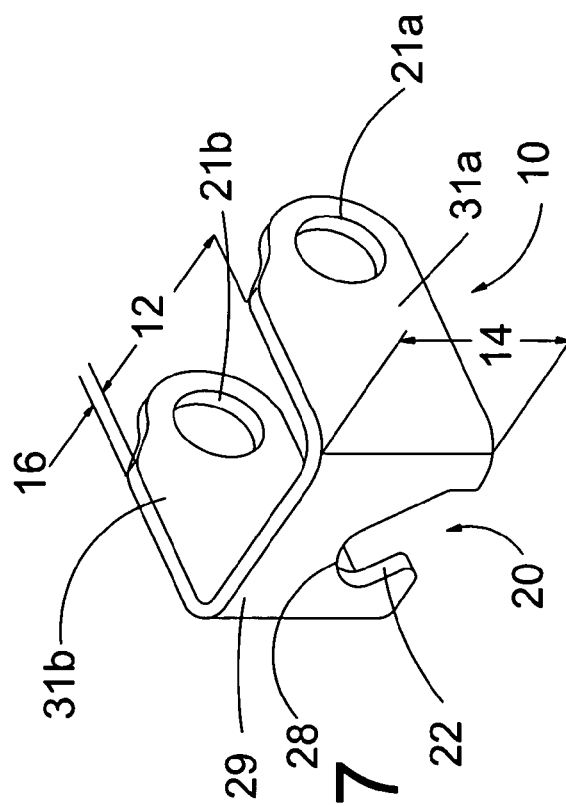
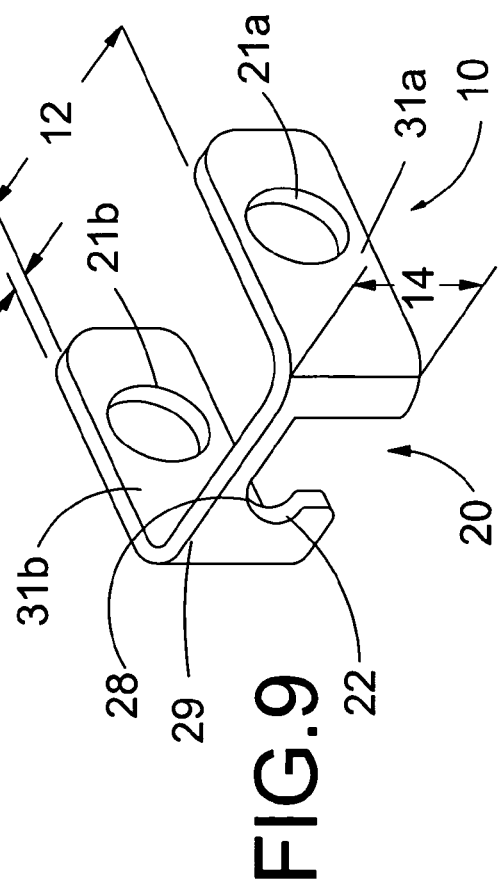
FIG.8
FIG.10
FIG.7
FIG.9

US 7,588,129 B2

HYDRAULIC CYLINDER LIMITER

CROSS REFERENCE TO RELATED PATENT APPLICATIONS

This applications claims priority to U.S. Provisional Patent Application No. 60/469,814 filed on Mar. 28, 2007.

BACKGROUND OF THE INVENTION

The present invention related to a limiting mechanism for the stroke of a hydraulic cylinder. Off road vehicles occasionally exhibit a deficiency of components rubbing against, and thereby damaging, nearby hydraulic cylinder pressure hoses. Limiting the stroke of the hydraulic cylinders solves this problem by restricting the hoses from the path of nearby components.

There are several varieties of hydraulic cylinder limiters and stops on the market. Some require assembly, multiple parts, or tools to apply them. Others have the potential to fall off the cylinder or machines with use, get caught up on other parts, injure the operators, or get caught up in the materials being handled.

Therefore, there is a need in the art for a device to limit the stroke of a hydraulic cylinder without unnecessary assembly, multiple parts, or tools to apply the device. Correspondingly, there is a need in the art for such a device that lacks the potential to fall off the cylinder, injure the operator, or catch other materials.

SUMMARY OF THE INVENTION

Accordingly, it is an object of the present invention to limit the stroke of a hydraulic cylinder such that the vehicle's components do not contact or interfere with nearby hydraulic hoses.

Another object of the present invention is to make the part's design simple enough for installation with no additional parts, thus eliminating the need for washers, bolts, nuts, and tools.

It is another object of the present invention to avoid welding in production of the part itself.

Yet another object of the present invention is to eliminate vertical movement of the part after installation.

It is yet another object of the present invention to eliminate lateral movement of the part after installation.

DESCRIPTION OF THE DRAWINGS

The advantages of this invention will be apparent upon consideration of the following detailed disclosure of the invention, especially when taken in conjunction with the accompanying drawings wherein:

FIG. 3 is a third perspective view of the limiter of FIG. 1.

FIG. 4 is a top planar view of the limiter of FIG. 1.

FIG. 5 is a front elevational view of the limiter of FIG. 1.

FIG. 6 is a side elevational view of the limiter of FIG. 1.

FIG. 7 is a perspective view of a second embodiment of the limiter of the present invention.

FIG. 8 is a side elevational view of the limiter of FIG. 7.

FIG. 9 is a perspective view of a third embodiment of the limiter of the present invention.

FIG. 10 is a front elevational view of the limiter of FIG. 9.

DESCRIPTION OF THE PREFERRED EMBODIMENT

Figures 1, 2:
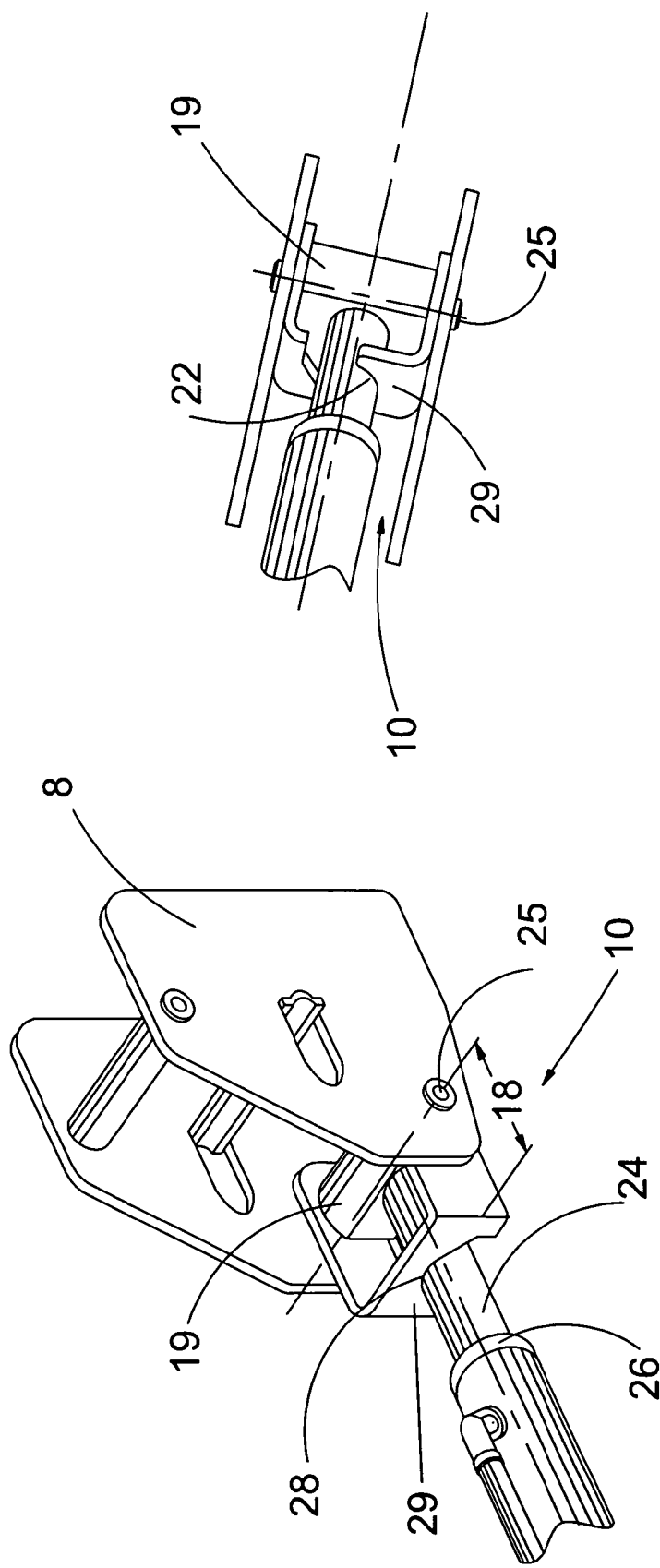
FIG. 1 is a perspective view of a first embodiment of the limiter of the present invention installed on a hydraulic cylinder assembly.
FIG. 2 is a second perspective view of the limiter of FIG. 1 installed on a hydraulic cylinder assembly.

FIGS. 1-2 show a limiter 10 for a hydraulic cylinder attached to the rod 24 of the cylinder by a pivot pin 25 at the mounting bracket 8. As shown in FIGS. 3-6, the limiter 10 is a U-shaped member having a front base 29 and two side walls 31a, 31b. The base 29 surface of the limiter 10 has a slot 20 which extends from an off center position along the lower edge of the base 29 surface to a semi-circular retention detent 28 located generally in the center of the limiter 10. The side walls 31a, 31b each have aligned attachment holes 21a, 21b through which a pivot pin 25 can be inserted for attaching the limiter 10 to the cylinder end 19. The center points of the attachment holes 21a, 21b are located at generally the same height as the relative center of the retention detent 28.

The limiter 10 is installed on a hydraulic cylinder by inserting the cylinder rod 24 through the slot 20 and sliding the rod 24 into the retention detent 28 such that the outer circumference of the rod 24 is generally in contact with the rounded sidewalls of the detent 28. Once the rod 24 is located in the detent 28 of the limiter 10, a pivot pin 25 is then inserted through the end of the rod 24 and the aligned attachment holes 21a, 21b of the sidewalls 31a, 31b securing the limiter to the rod 24 and restricting movement therebetween. During operation the cylinder and limiter both jointly pivot as constant contact is maintained between the rod of the cylinder and the internal edges of the retention detent 28. Once installed, the cylinder end 26 will contact the limiter base 29 during retraction of the rod 24 thus limiting the overall stroke of the cylinder.

The shape of the slot 20 and detent 28 prevent relative motion between the limiter and the cylinder rod 24. As shown in FIGS. 3 and 5 the rod entrance to an angled slot 20, along the edge of the limiter is at an off center position on the face of the limit, while the semi circular detent is generally centered with regard to both the width 12 and height of the base. The detent is shaped such that during rotation of the cylinder in an upward direction with respect to FIG. 1 the top half of inserted rod will remain in contact with the upper edge of the detent 28. When rotated in a downward direction the rod will contact an inner side wall of the slot 22 thus maintaining the general position of the limiter. As shown in FIG. 9 and 10, the slot 20 and detent 28 can also be oriented such that the slot 20 is oriented in a generally vertical direction wherein the detent 28 is offset generally horizontally from the slot 20.

The limiter 10 is sized to prevent both vertical and horizontal movement of the limiter 10 with respect to the rod 24 while limiting retraction of the cylinder rod 24 into the cylinder. The width 12 of the limiter 10 is sized such that the internal surfaces of the sidewalls 31a, 31b are in close proximity to the cylinder end 19 to prevent horizontal movement. No vertical movement of the limiter 10 occurs because of angles of the slot 22 and detent 28, in conjunction with the pivot pin 25, secure the limiter in a fixed position.

The distance 18 between the center line of the aligned attachment holes 21a, 21b and the base 29 surface can be made of varied lengths corresponding to the desired restriction of travel of the cylinder.

As shown in FIGS. 7-8, the dimensions 12, 14 of the base can be altered for use with different sized cylinder ends 19 and modified for use with varying apparatuses. The center of the attachment holes 21a, 21b, however, must remain at the same height level as the center of a rod 24 at rest in the detent 28 so that the contact between the outer surface of the rod the inner edge of the limiter '28 is generally parallel.

Having thus described the invention, what is claimed is:

1. A limiter bracket for a cylinder comprising:
 a U-shaped member having a central base portion and two opposing sidewalls generally perpendicularly connected to opposing first and second sides of the base;
 the base having a slot extending from a mouth in a third side of the base to a retention detent generally located along a vertical centerline of the base, wherein the mid point of the mouth of the slot is horizontally offset from the vertical centerline; and
 each sidewalls having an attachment opening aligned with the opening of the opposing sidewall.

2. The limiter bracket as claimed in claim 1, wherein the slot extends vertically in a direction generally perpendicular to the third side of the base.

3. The limiter bracket as claimed in claim 1, wherein:
 the slot extends angularly across the base from the mouth to the retention detent.

4. The limiter bracket as claimed in claim 1; wherein the retention detent is semi-circular and the center point of the detent and center points of the attachment are located at generally equal vertical heights.

5. The hydraulic cylinder assembly as claimed in claim 1; wherein the retention detent is semi-circular and the center point of the detent and center points of the attachment are located at generally equal vertical heights.

6. A hydraulic cylinder assembly comprising:
 a hydraulic cylinder having a cylinder rod;
 a connector attached to an external end of the cylinder rod;
 a U-shaped member having a central base portion and two opposing sidewalls generally perpendicularly connected to first and second opposing sides of the base;
 the base having a slot extending from a mouth in a third side of the base to a retention detent generally located along a vertical centerline of the base, wherein the mid point of the mouth of the slot is horizontally offset from the vertical centerline; and
 each sidewall having an attachment hole aligned with the hole of the opposing sidewall, wherein a pivot pin is inserted through the end connector and both attachment openings.

7. The hydraulic cylinder assembly as claimed in claim 6, wherein an inner surface of each sidewall is in general contact with the connector.

8. The hydraulic cylinder assembly as claimed in claim 6, wherein the slot extends vertically in a direction generally perpendicular to the third side of the base.

9. The hydraulic cylinder assembly as claimed in claim 6, wherein:
 the slot extends angularly across the base from the mouth to the retention detent.

\* \* \* \* \*